(12) United States Patent
Banik et al.

(10) Patent No.: US 8,135,425 B1
(45) Date of Patent: Mar. 13, 2012

(54) SYSTEM AND METHOD FOR COMMUNICATING DATA OVER A RADIO FREQUENCY VOICE CHANNEL

(75) Inventors: Somnath Banik, Allentown, PA (US); James A. Johanson, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 1826 days.

(21) Appl. No.: 09/514,489

(22) Filed: Feb. 29, 2000

(51) Int. Cl.
*H04B 7/00* (2006.01)

(52) U.S. Cl. .......................... 455/511; 375/348

(58) Field of Classification Search .................. 455/462, 455/465, 555, 67.1, 422, 512, 72, 84, 417, 455/466, 455, 511, 79, 116; 370/477, 529; 379/399, 391, 434
See application file for complete search history.

(56) References Cited

U.S. PATENT DOCUMENTS

| | | | |
|---|---|---|---|
| 4,512,013 A * | 4/1985 | Nash et al. .............. | 370/215 |
| 5,020,051 A * | 5/1991 | Beesley et al. .............. | 370/280 |
| 5,170,490 A * | 12/1992 | Cannon et al. .............. | 455/33.1 |
| 5,579,535 A * | 11/1996 | Orlen et al. .............. | 455/33.1 |
| 5,661,718 A * | 8/1997 | Bremer et al. .............. | 370/207 |
| 5,737,394 A * | 4/1998 | Anderson et al. .............. | 379/354 |
| 5,960,357 A * | 9/1999 | Kim .............. | 455/462 |
| 6,014,569 A * | 1/2000 | Bottum .............. | 455/466 |
| 6,041,227 A * | 3/2000 | Sumner .............. | 379/88.1 |
| 6,044,266 A * | 3/2000 | Kato .............. | 455/422 |
| 6,122,271 A * | 9/2000 | McDonald et al. .............. | 379/88.1 |
| 6,130,898 A * | 10/2000 | Kostreski et al. .............. | 379/354 |
| 6,219,539 B1 * | 4/2001 | Basu et al. .............. | 455/417 |
| 6,259,710 B1 * | 7/2001 | Junghans .............. | 370/522 |
| 6,301,287 B1 * | 10/2001 | Walley et al. .............. | 375/140 |
| 6,349,212 B1 * | 2/2002 | Martensson et al. .............. | 455/462 |
| 6,408,177 B1 * | 6/2002 | Parikh et al. .............. | 455/414.4 |

* cited by examiner

*Primary Examiner* — Tu X Nguyen

(57) ABSTRACT

A system or method for communicating data over a voice channel between a transmitter and a receiver. In one embodiment, the system includes: (1) a silence detector, coupled to the transmitter, that identifies a pause in voice traffic that is to be transmitted over the voice channel and generates an interjection signal during the pause and (2) a data injector, coupled to the silence detector, that receives the interjection signal and responds by causing the transmitter to transmit data to the receiver over the voice channel.

20 Claims, 3 Drawing Sheets

SYSTEM AND METHOD FOR COMMUNICATING DATA OVER A RADIO FREQUENCY VOICE CHANNEL

TECHNICAL FIELD OF THE INVENTION

The present invention is directed, in general, to a communication system and, more specifically, to a system and method of sending data over a voice channel.

BACKGROUND OF THE INVENTION

The telecommunications industry continues to seek ways to accommodate and enhance services available to its customers. Telephone customers are moving, with ever-increasing speed, toward a collection of wireless solutions as they expect their communication capabilities to become less restrictive and tied to devices that are constrained to use wire to function. A popular solution is a portable telephone, typically made up of a base station connected to telephone wiring and a portable handset wirelessly communicates with the base station to allow a user freedom of movement within some radius of the base station. The portable telephone offers a user "airtime" limited only by the endurance of the handset battery. This "airtime" is free to the user, who pays only for the wired connection.

The basic service provided includes voice traffic as with any normal telephone service. Another service that may be available is caller identification, which allows the caller's name and telephone number to be displayed on a handset display for observation by the user. Typically, the caller identification is data made available before a call is answered. The caller identification typically does not interfere with the voice traffic since it occurs before the voice traffic starts. Another service that may be provided is caller identification for a call that is waiting, that is, call-waiting caller identification. This data occurs during voice traffic and does interfere with the voice traffic by blanking or overwriting the voice traffic with the data to be displayed.

A steady stream of call-waiting caller identification data may significantly degrade the quality of the voice traffic making it difficult to continue a conversation. This is particularly true when a large data set needs to be transferred such as the case of refreshing the handset display. A portable telephone user may also want to use the handset display for a collection of other data or as a menu to select desired data. This data may encompass data from a private database or data that is available in the public sector, such as the Internet. Transferring large amounts of data or repetitively transferring smaller amounts of data will reduce the overall quality of the voice traffic.

Accordingly, what is needed in the art is a way to accommodate a collection of data over a portable phone without affecting the voice traffic on the phone.

SUMMARY OF THE INVENTION

To address the above-discussed deficiencies of the prior art, the present invention provides a system or method for communicating data over a voice channel between a transmitter and a receiver. In one embodiment, the system includes: (1) a silence detector, coupled to the transmitter, that identifies a pause in voice traffic that is to be transmitted over the voice channel and generates an interjection signal during the pause and (2) a data injector, coupled to the silence detector, that receives the interjection signal and responds by causing the transmitter to transmit data to the receiver over the voice channel.

The present invention therefore introduces the broad concept of sending packets of data during pauses or periods of silence that occur during voice interchanges. The present invention enjoys substantial utility in that it makes efficient use of the communication channel and eliminates possible distortions in the voice transmission that may occur if data and voice are superimposed. This is particularly true if large amounts of data must be transferred, such as the data that may be needed to refresh a display, such as a liquid crystal display (LCD).

In one embodiment of the present invention, the voice traffic is analog voice traffic. Analog voice traffic is perhaps the most common form of voice traffic and, by virtue of the nature of speech, typically affords ample time to inject digital forms of data. Those skilled in the pertinent art will understand that digital voice traffic may also be used to inject other data not related to voice, as well.

In one embodiment of the present invention, the transmitter is associated with a base station of a cordless telephone and the receiver is associated with a handset of the cordless telephone. Those skilled in the pertinent art are familiar with other applications wherein data may be advantageously interposed with voice transmissions.

In one embodiment of the present invention, the data comprises caller identification data. Caller identification data is a particularly advantageous form of data to blend with voice traffic. Of course, one skilled in the pertinent art will understand that many other forms of data may also be used.

In one embodiment of the present invention, the data comprises menu item selection data. Menu item selection data is particularly advantageous in that it allows a recipient to efficiently respond to a suite of choices that may be selected to match a particular context associated with a voice traffic situation. Of course, the menu items may also be of a general nature having broader application.

In one embodiment of the present invention, the transmitter transmits the voice traffic in frames. The transmission of voice in frames allows for the prediction of periods of silence, which may be denoted as "silence frames" that would be used to incorporate data. Those skilled in the pertinent art are familiar with such frame structures pertaining to voice and data as well.

In one embodiment of the present invention, the silence detector identifies the pause by comparing a peak energy of the voice traffic to a noise floor reference. Of course, many other ways of identifying pauses in a voice conversation are well within the scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
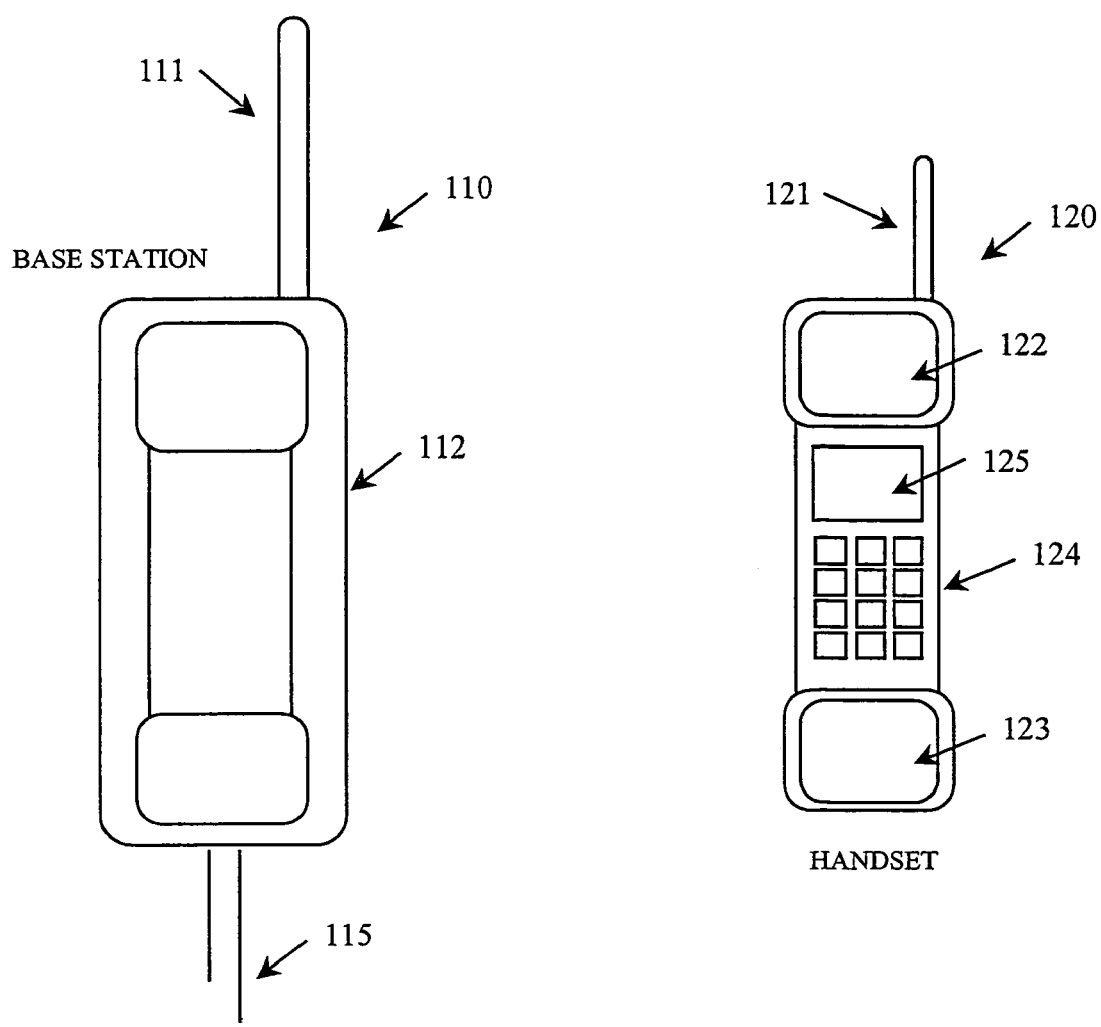
FIG. 1 illustrates a pictorial diagram of a cordless telephone constructed according to the principles of the present invention.

Referring initially to FIG. 1. Illustrated is a pictorial diagram of a cordless telephone 100 constructed according to the principles of the present invention. The cordless telephone 100 includes a base station transceiver 110 and a handset transceiver 120. The base station transceiver 110 is connected to a telephone line 115 and includes a base station antenna 111 and a handset cradle 112. The handset transceiver 120 includes a handset antenna 121, a receiving transducer 122, a sending transducer 123, a touch tone keypad 124 and a data display 125.

The base station antenna 111 transmits both voice and data information to the handset antenna 121. The handset antenna 121 receives the information and presents the voice information to the receiving transducer 122 and the data information to the data display 125. The handset antenna 121 typically transmits voice and data information to the base station antenna 111, which receives the voice information and presents it to the telephone line 115. The received data information from the touch tone keypad 124 is typically used to establish an initial call by the user of the handset transceiver 120, but may also be used to request other information as appropriate to the call.

The present invention provides a system or method for communicating data over a voice channel between a transmitter and a receiver, such as the base station transceiver 110 and the handset transceiver 120. In the illustrated embodiment, the system identifies a pause in voice traffic that is to be transmitted over the voice channel and generates an interjection signal during the pause. The injection signal then causes the transmitter to transmit data to the receiver over the voice channel. In this embodiment, the voice traffic is analog voice traffic. Analog voice traffic is a common form of voice traffic and typically affords ample time during a conversation to inject digital forms of data. Those skilled in the pertinent art will understand that digital voice traffic may also be used to inject other data not related to voice, as well. Although associated with the base station 110 in the illustrated embodiment, there are other applications wherein data may be advantageously interposed with voice transmissions.

In the illustrated embodiment, the data comprises caller identification data. Caller identification data is a particularly advantageous form of data to blend with voice traffic. Sending caller identification data during pauses in voice traffic allows the voice information to appear to be uninterrupted, thereby greatly reducing the probability of misunderstanding in the voice communication. Of course, one skilled in the pertinent art will understand that many other forms of data may also be used.

The data may also include menu item selection data. Menu item selection data is particularly advantageous in that it allows a recipient to efficiently respond to a suite of choices that may be selected to match a particular context associated with a voice traffic situation. Alternately, the menu items may also be of a general nature having broader application.

Figure 2:
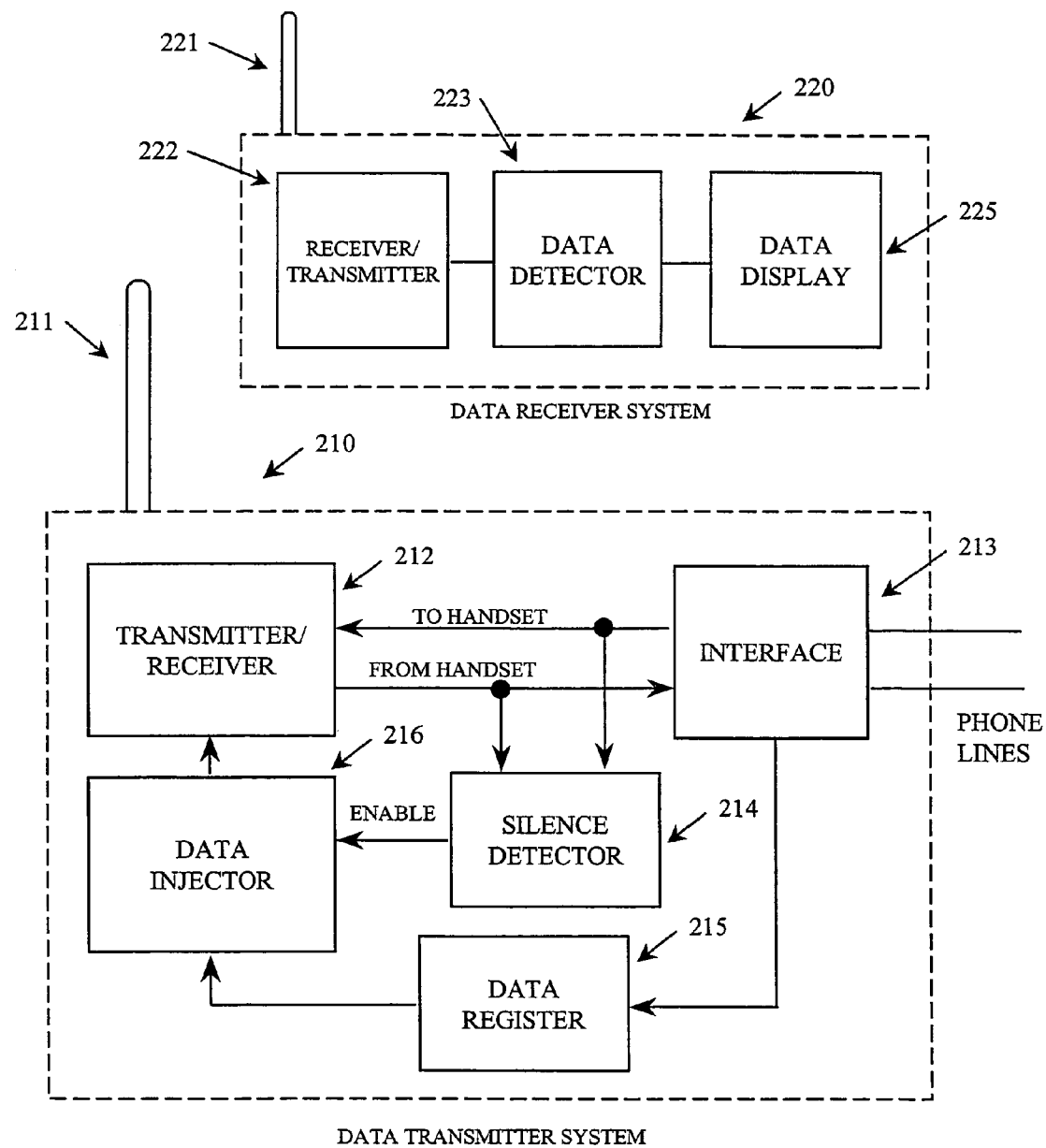
FIG. 2 illustrates a block diagram of a data system associated with the cordless telephone of FIG. 1 showing additional functional detail.

Turning now to FIG. 2, illustrated is a block diagram of a data system 200 associated with the cordless telephone 100 of FIG. 1 showing additional functional detail. In the illustrated embodiment, a data transmitter system 210 is associated with the base station 110 and a data receiver system 220 is associated with the handset 120 of the cordless telephone 100. The data system 200 does not illustrate all of the functions associated with the cordless telephone 100, but rather an embodiment of those functions that are pertinent to the present invention.

The data transmitter system 210 includes a base station antenna 211, a transmitter/receiver 212, a telephone line interface 213, a silence detector 214, a data register 215 and a data injector 216. Voice and data information are accepted from the phone lines by the interface 213. Voice information is presented to the transmitter/receiver 212 for transmission to the handset 120 in the regular manner via the base station antenna 211. Data information is routed to the data register 215, for holding, from the interface 213 until it is appropriate for it to be transmitted to the data receiver system 220. The silence detector 214, coupled to the transmitter/receiver 212, identifies a pause in voice traffic and generates an interjection signal during the pause. This interjection signal enables the data injector 216 during this pause, causing the transmitter/receiver 212 to transmit data to the data receiver system 220 over the voice channel.

The data receiver system 220 includes a handset antenna 221, a receiver/transmitter 222, a data detector 223 and a data display 225. Voice information is received by the handset antenna 221 and processed in a normal fashion. Data information is also received from the data transmitter system 210 through the handset antenna 221 by the receiver/transmitter 222, then presented to the data detector 223 for detecting and decoding before the data is displayed in the data display 225 for user observation.

The data information may include a variety of caller identification information and formats. Additionally, the data information may include any collection that may be pertinent to the user, including private or confidential information from a database. The data information may also be publicly available, such as that from the Internet. The user may also request information by using menu selection options presented by the data display 225.

In the illustrated embodiment, the transmitter/receiver 212 transmits the voice traffic in frames, thereby virtually guaranteeing periods of silence and advantageously assuring that these periods are predictable in duration. Such periods of silence may be denoted as silence frames wherein data may be incorporated. In other embodiments not using voice traffic in frames, these periods of silence still exist but are typically less predictable in occurrence. The silence detector 214 may use several techniques to identify the pause in voice traffic, such as an average energy measurement or a peak energy measurement. In the illustrated embodiment, by comparing a peak energy of the voice traffic to a noise floor reference, the pause in voice traffic is confirmed. Of course, other ways of identifying pauses in a voice conversation are well within the scope of the present invention.

Figure 3:
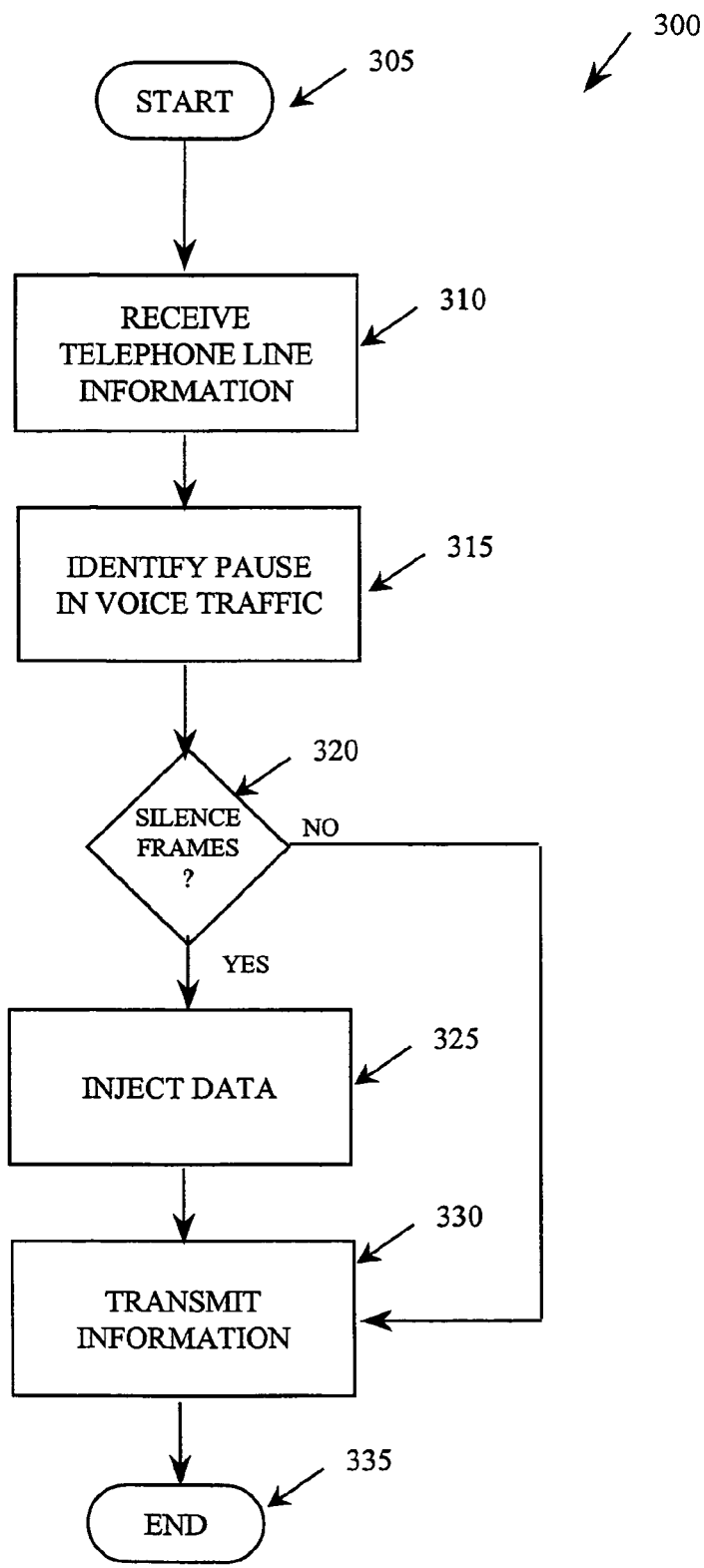
FIG. 3, illustrates a flow diagram of a method carried out according to the principles of the present invention.

Turning now to FIG. 3, illustrated is a flow diagram of a method 300 carried out according to the principles of the present invention. The method 300 starts in a step 305 wherein both voice and data information are desired to be communicated between a transmitter and a receiver. The data information is to be sent without appearing to interrupt or overwrite the voice information, which is analog voice traffic. In the illustrated embodiment, the method 300 is applied only if data information is available.

In this embodiment, the transmitter receives information from the phone lines in a step 310. The information received in the step 310 is then monitored as to whether it is voice or data in a step 315. Data information is buffered and a pause in voice traffic is also identified in the step 315. The data information may be caller identification or a menu item selection as pertinent to the particular application.

In a first decision point denoted "Silence Frames?" in a step 320, the decision is made as to whether there is a pause in the voice information indicating a silence frame. If the decision is YES and a pause in voice information has been identified, the data information is injected into an interstice in the voice information in a step 325. Then, in a step 330, the data information is transmitted to the receiver for display. Silence frames are typically marked or tracked so that the handset knows not to play them in its associated speaker. Additionally, if there is no data available to be sent, the transmitter and receiver function normally, as noted above. If the decision is NO in the first decision point denoted "Silence Frames?" in the step 320 (indicating no pause in the voice traffic), the voice information is transmitted to the receiver in the step 330. The method 300 continues in this manner until all voice and data information has been transmitted to the receiver, at which point the method 300 ends in a step 335.

From the above, it is apparent that the present invention introduces the broad concept of sending packets of data during pauses or periods of silence that occur during voice interchanges. This approach has substantial utility in making efficient use of the communication channel without introducing distortions in the voice transmission that would otherwise occur were data and voice to be superimposed. This is particularly true if large amounts of data must be transferred, such as the data that may be needed to refresh a liquid crystal display (LCD).

Although the present invention has been described in detail, those skilled in the art should understand that they can make various changes, substitutions and alterations herein without departing from the spirit and scope of the invention in its broadest form.

What is claimed is:

1. For use in communicating data over a voice channel between a transmitter of a base station and a receiver of a handset of a cordless telephone, a system comprising:
    a silence detector, coupled to said transmitter, that identifies a pause in voice traffic that is to be transmitted over said voice channel and generates an interjection signal during said pause; and
    a data injector, coupled to said silence detector, that receives said interjection signal and responds by causing said transmitter to transmit data to said receiver over said voice channel.

2. The system as recited in claim 1 wherein said voice traffic is analog voice traffic.

3. The system as recited in claim 1 wherein said data comprises caller identification data.

4. The system as recited in claim 1 wherein said data comprises menu item selection data.

5. The system as recited in claim 1 wherein said transmitter transmits said voice traffic in frames.

6. The system as recited in claim 1 wherein said silence detector identifies said pause by comparing a peak energy of said voice traffic to a noise floor reference.

7. The system as recited in claim 1 wherein said system receives said voice traffic and said data from a telephone line coupled thereto.

8. A method of communicating data over a voice channel between a transmitter of a base station and a receiver of a handset of a cordless telephone, comprising:
    identifying a pause in voice traffic that is to be transmitted over said voice channel; and
    responding to said pause by causing said transmitter to transmit data to said receiver over said voice channel.

9. The method as recited in claim 8 wherein said voice traffic is analog voice traffic.

10. The method as recited in claim 8 wherein said data comprises caller identification data.

11. The method as recited in claim 8 wherein said data comprises menu item selection data.

12. The method as recited in claim 8 wherein said transmitter transmits said voice traffic in frames.

13. The method as recited in claim 8 wherein said identifying comprises comparing a peak energy of said voice traffic to a noise floor reference.

14. The method as recited in claim 8 further comprising receiving said voice traffic and said data from a telephone line coupled to said base station.

15. A cordless telephone, comprising:
    a base station transceiver;
    a handset transceiver, said base station and handset transceivers cooperable to establish a voice channel therebetween;
    a silence detector, coupled to said base station transceiver, that identifies a pause in voice traffic that is to be transmitted over said voice channel and generates an interjection signal during said pause; and
    a data injector, coupled to said silence detector, that receives said interjection signal and responds by causing said base station transceiver to transmit data to said receiver over said voice channel.

16. The cordless telephone as recited in claim 15 wherein said voice traffic is analog voice traffic.

17. The cordless telephone as recited in claim 15 wherein said data comprises caller identification data.

18. The cordless telephone as recited in claim 15 wherein said data comprises menu item selection data.

19. The cordless telephone as recited in claim 15 wherein said base station transceiver transmits said voice traffic in frames.

20. The cordless telephone as recited in claim 15 wherein said silence detector identifies said pause by comparing a peak energy of said voice traffic to a noise floor reference.

* * * * *